(12) United States Patent
Bell (10) Patent No.: US 12,066,124 B2
(45) Date of Patent: Aug. 20, 2024

(54) METHODS AND APPARATUS TO REDUCE NOISE IN VALVES

(71) Applicant: Fisher Controls International LLC, Marshalltown, IA (US)

(72) Inventor: Brandon Wayne Bell, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 17/864,870

(22) Filed: Jul. 14, 2022

(65) Prior Publication Data

US 2024/0019046 A1    Jan. 18, 2024

(51) Int. Cl.
*F16K 47/02*    (2006.01)
*F16K 5/06*    (2006.01)

(52) U.S. Cl.
CPC .......... *F16K 47/02* (2013.01); *F16K 5/0605* (2013.01)

(58) Field of Classification Search
CPC .......... F16K 47/02; F16K 47/08; F16K 47/14; F16K 47/16; F16K 5/0605; F16L 55/0331; F16L 55/02781; F16L 55/033
See application file for complete search history.

(56) References Cited

U.S. PATENT DOCUMENTS

| | | | |
|---|---|---|---|
| 4,007,908 A | * | 2/1977 | Smagghe .......... F16L 55/02709 138/40 |
| 4,988,586 A | * | 1/1991 | Toyoda .................. A01N 63/27 435/252.33 |
| 8,931,591 B2 | | 1/2015 | Fagerlund et al. |
| 9,376,946 B1 | | 6/2016 | Eliers et al. |

* cited by examiner

*Primary Examiner* — Michael R Reid
(74) *Attorney, Agent, or Firm* — Hanley, Flight & Zimmerman, LLC (57) ABSTRACT

Methods and apparatus are disclosed to reduce noise in valve. An example valve includes a valve body defining an inner cavity that fluidly couples an inlet of the valve and an outlet of the valve, the inner cavity having an inner wall with annular cavities spaced apart from one another along a direction of flow of the valve body, a trim to vary a degree of flow of fluid between the inlet and the outlet, and a screen positioned within the inner cavity, the screen at least partially surrounded by the annular cavities and including a pattern of apertures to disperse sound waves generated when the fluid moves therethrough.

19 Claims, 8 Drawing Sheets

FIG. 9

METHODS AND APPARATUS TO REDUCE NOISE IN VALVES

FIELD OF THE DISCLOSURE

This disclosure relates generally to valves and, more particularly, to methods and apparatus to reduce noise in valves.

BACKGROUND

Valves are commonly used in a variety of industrial applications. Fluid valves typically include a valve trim to control the flow of fluid between an inlet and an outlet. During operation, fluid flowing through a valve can generate significant audible noise.

SUMMARY

An example valve includes a valve body defining an inner cavity that fluidly couples an inlet of the valve and an outlet of the valve, the inner cavity having an inner wall with annular cavities spaced apart from one another along a direction of flow of the valve body, a trim to vary a degree of flow of fluid between the inlet and the outlet, and a screen positioned within the inner cavity, the screen at least partially surrounded by the annular cavities and including a pattern of apertures to disperse sound waves generated when the fluid moves therethrough.

An example apparatus for use with a valve includes a wall defining a fluid passageway between an inlet and an outlet, wherein at least a portion of the wall includes ring-shaped grooves positioned downstream from a trim of the valve, the ring-shaped grooves spaced apart from one another along a direction of flow of the fluid passageway, and a screen extending along the direction of flow of the wall, the screen including a pattern of apertures at least partially surrounded by the ring-shaped grooves to disperse sound waves generated when a fluid moves through the valve.

An example method of producing a noise reduction valve includes positioning a trim in a valve body, an inner cavity of the valve body having annular cavities, the inner cavity fluidly coupled to an inlet and an outlet of the valve, the inner cavity having the annular cavities spaced apart from one another along a direction of flow of the valve body, and placing a screen in the inner cavity to at least partially surround the screen with the annular cavities, the screen including a pattern of apertures.

In general, the same reference numbers will be used throughout the drawing(s) and accompanying written description to refer to the same or like parts. The figures are not to scale. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Methods and apparatus to reduce noise in valves are disclosed. Valves are commonly used to control the flow of a fluid between an inlet and an outlet. When a valve is in a closed position, the valve restricts fluid from flowing between the inlet and the outlet. Alternatively, when the valve is in an opened position, the valve permits fluid flow between the inlet and the outlet. Some known valves, such as ball and plug valves, include a ball or a plug that can alternate between a closed position to block fluid flow, an open position to allow maximum fluid flow, and one or more intermediate positions to enable a greater degree of control over fluid flow. In some instances, when a valve is open or partially open, the flow of fluid through the valve creates a significant amount of audible noise. The noise may be caused by the aerodynamic flow, the pressure drop, cavitation, and/or other fluid flow characteristics.

Examples disclosed herein effectively disperse (e.g., attenuate) sound waves associated with the flow of fluid through the valve, thereby significantly reducing (e.g., dampening) audible noise of the valve. In other words, examples disclosed herein can reduce relatively high noise levels produced by the aforementioned flow of fluid. Examples disclosed herein include a perforated screen disposed within a wall of a valve for diverting (e.g., disrupting, dispersing, etc.) sound waves in a body of the valve. To that end, examples disclosed herein include annular cavities positioned on inner walls of the valve, such that the cavities disrupt sound waves. In some examples, the perforated screen and the annular cavities can be associated with a rotary ball of a ball valve.

An example valve disclosed herein includes a valve body defining an inner cavity (e.g., fluid passageway) fluidly coupled to and/or between an inlet and an outlet of the valve.

In turn, the inner cavity includes an inner wall (e.g., an inner chamber wall) with annular cavities (e.g., ring-shaped grooves, ring cavities, etc.) spaced apart from one another along a longitudinal direction of the valve body and/or direction of flow. The example valve includes a trim movable to vary a degree of flow between the inlet and the outlet. The example valve also includes a screen (e.g., a perforated screen, a cylindrical screen, etc.) positioned within the inner cavity. The screen is at least partially surrounded by the annular cavities and includes a pattern of apertures (e.g., perforations) to disperse sound waves generated by the valve body when a fluid moves therethrough. In some examples, the screen and the annular cavities are aligned and/or concentric. In particular, fluid can flow through the example valve in a direction that is generally parallel to a longitudinal direction of the screen. As a result, the screen (e.g., the apertures included in the screen) in combination with the annular cavities attenuates noise associated with the fluid flow.

In some examples, the outlet of the valve is generally concentric and/or aligned with the screen and the annular cavities. In some examples, the annular cavities and the screen are positioned between and/or extend between the trim and the outlet. In particular, at least a portion of an outer wall can taper in a direction from the trim to the outlet, such that the annular cavities increase in diameter (e.g., radially increase in size) along a direction between the trim and the outlet. In other words, the annular cavities can vary in size in a direction along which the outer wall extends. In some examples, the screen is positioned within a central bore of a rotary ball. For example, the central bore of the rotary ball can include an inner surface with the annular cavities spaced apart from one another other along a longitudinal direction of flow associated with the rotary ball. In some examples, when the valve is open, the central bore is substantially concentric and/or aligned with the outlet (e.g., first rotational position). Conversely, when the valve is closed, the central bore extends in a direction different from the outlet (e.g., second rotational position).

Figure 1:
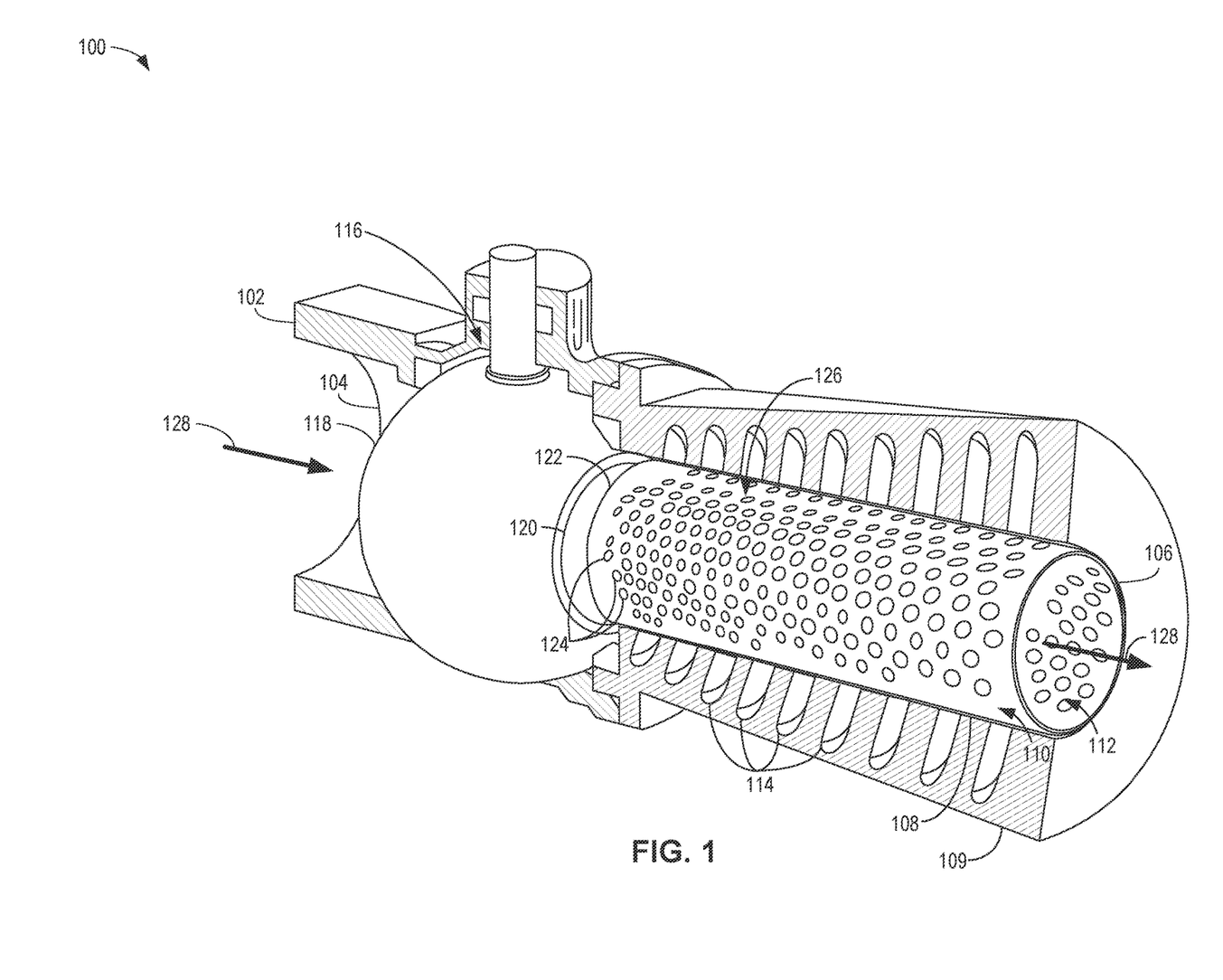
FIG. 1 is a partial cross-sectional view of an example valve in accordance with teachings of this disclosure.

FIG. 1 is a partial cross-sectional view of an example valve 100 in accordance with teachings of this disclosure. The example valve 100 includes a valve body 102 defining a fluid inlet 104 and a fluid outlet 106, as well as an inner wall 108 and an outer wall 109. In turn, the example inner wall 108 defines an inner cavity 110 of the valve body 102. In this example, the inner wall 108 exhibits a generally cylindrical shape (e.g., straight cylindrical shape), defining a fluid passageway 112 of the valve body 102, and the outer wall 109 exhibits a generally tapered cylindrical shape. In some examples, the outer wall 109 can exhibit a generally cylindrical shape. In the illustrated example of FIG. 1, the inner wall 108 includes and/or defines annular cavities 114 (e.g., ring-shaped grooves) spaced apart from one another along a longitudinal direction of the valve body 102 (e.g., ones of the annular cavities 114 are spaced at a same distance or pitch therebetween, spacing between ones of the annular cavities 114 increases or decreases along a direction of flow, etc.). In this example, sizes of at least two of the annular cavities 114 increase or decrease along a direction of flow of the valve 100 and/or the valve body 102.

The example valve 100 further includes a trim 116 positioned inside the valve body 102 between the fluid inlet 104 and the fluid outlet 106. In particular, the example trim 116 includes a rotary ball 118 that rotates to control an amount of fluid flowing through the valve body 102. In some examples, a central bore 120 of the ball 118 can be rotated to partially open and/or partially close the valve 100.

In the illustrated example of FIG. 1, an example screen 122 is positioned within the inner cavity 110 between the trim 116 and the fluid outlet 106. In some examples, a center axis of the screen 122 and center axes of the annular cavities 114 are generally concentric with one another (e.g., within 5% of a diameter of the center axis of the screen 122 or the center axis of the annular cavities 114). Additionally or alternatively, the screen 122 and the annular cavities 114 can be generally concentric with a diameter and/or geometric center of an opening of the fluid outlet 106. Further, a diameter of the screen 122 and a diameter of at least a portion of the inner wall 108 (e.g., an entirety of the inner wall 108) can be substantially the same (e.g., within 5%). In this example, the screen 122 can have the same diameter as the bore 120 (e.g., within 5% of a diameter of the bore 120), wherein the screen 122 and the bore 120 can be generally concentric with one another.

The example screen 122 shown in FIG. 1 includes a pattern of apertures (e.g., perforations) 124 that extend through a screen wall 126. In FIG. 1, the apertures 124 are generally circular in shape. However, the apertures 124 can have different shapes including, but not limited to, elliptical, rectangular, triangular, hexagonal, etc. The example apertures 124 are arranged in a pattern in the screen wall 126. In this example, the apertures 124 have a uniform size and shape, and are generally uniformly spaced across an outer surface of the screen 122. In some examples, the size, shape, and/or spacing of the apertures 124 can vary.

With the valve 100 in an open (e.g., partially open) position, fluid flows through the inner cavity 110, the central bore 120, and the screen 122 in a direction generally indicated by arrows 128. As a result, the apertures 124 in the screen wall 126 enable sound waves associated with the moving fluid to travel back and forth between the annular cavities 114 of the inner wall 108 and the interior of the screen 122, thereby reducing acoustic output (e.g., in the form of noise) of the valve 100. To that end, the annular cavities 114 are arranged to reflect (e.g., disperse, disrupt, attenuate, etc.) the sound waves. Thus, the screen 122 and the annular cavities 114 can reduce noise generated during operation of the valve 100. In the example of FIG. 1, the screen 122 and the annular cavities 114 are positioned downstream from the trim 116 (e.g., between the trim 116 and the outlet 106). However, in some examples, the trim 116 can include and/or be integral with the screen 122 and the annular cavities 114, as described in further detail below in connection with FIGS. 3-5.

In the illustrated example of FIG. 1, at least a portion of the outer wall 109 (e.g., an entirety of the outer wall 109) tapers along a direction from the fluid outlet 106 to the trim 116. Accordingly, diameters of the annular cavities 114 vary in size, including width and/or depth, along the longitudinal direction of the valve body 102. In particular, the annular cavities 114 increase in diameter along a direction from the trim 116 to the outlet 106. In some examples, the annular cavities 114 vary in size to reflect and/or reduce an amplitude of different frequencies of the sound waves associated with fluid flow through the valve 100.

Figure 2:
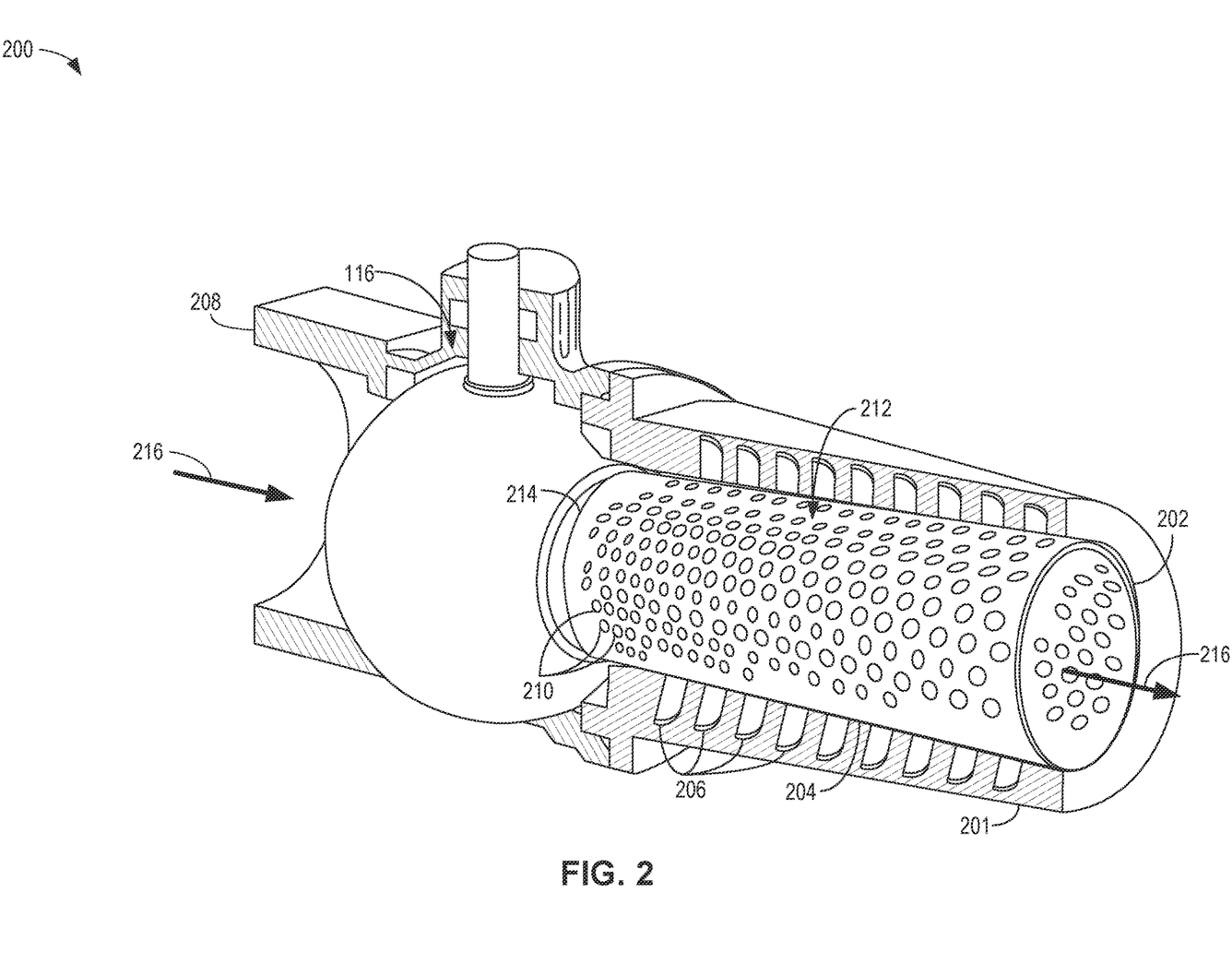
FIG. 2 is a partial cross-sectional view of another example valve in accordance with teachings of this disclosure

FIG. 2 is a partial cross-sectional view of another example valve 200 in accordance with teachings of this disclosure. The example valve 200 of FIG. 2 is similar to the example valve 100 of FIG. 1, but includes a converging outer wall 201 along a direction from the trim 116 to an outlet 202. In the illustrated example of FIG. 2, the outer wall 201 (e.g., a portion of the outer wall 201) tapers from the trim 116 to the outlet 202. In this example, an inner wall 204 includes annular cavities 206 spaced apart from one another along the longitudinal direction of a valve body 208 (e.g., a direction of flow of the valve body 208). Additionally or alternatively, the annular cavities 206 decrease in diameter along a direction from the trim 116 to the outlet 202. As a result, apertures 210 in a screen wall 212 enable sound waves associated with the moving fluid to travel back and forth between the annular cavities 206 of the inner wall 204 and the interior of a screen 214, thereby reducing acoustic output (e.g., in the form of overall noise) of the valve 200 as fluid flows in a direction generally indicated by arrows 216. To that end, the annular cavities 206 are arranged to reflect (e.g., disperse, disrupt, etc.) the sound waves. Thus, the screen 214 and the annular cavities 206 can reduce noise generated during operation of the valve 200. In the illustrated examples of FIGS. 1 and 2, the valves 100, 200, respectively, are depicted as ball valves. However, the example valves 100, 200 can be implemented as any type of valve including, but not limited to, a gate valve, a plug valve, a butterfly valve, a pinch valve, etc.

Figure 3:
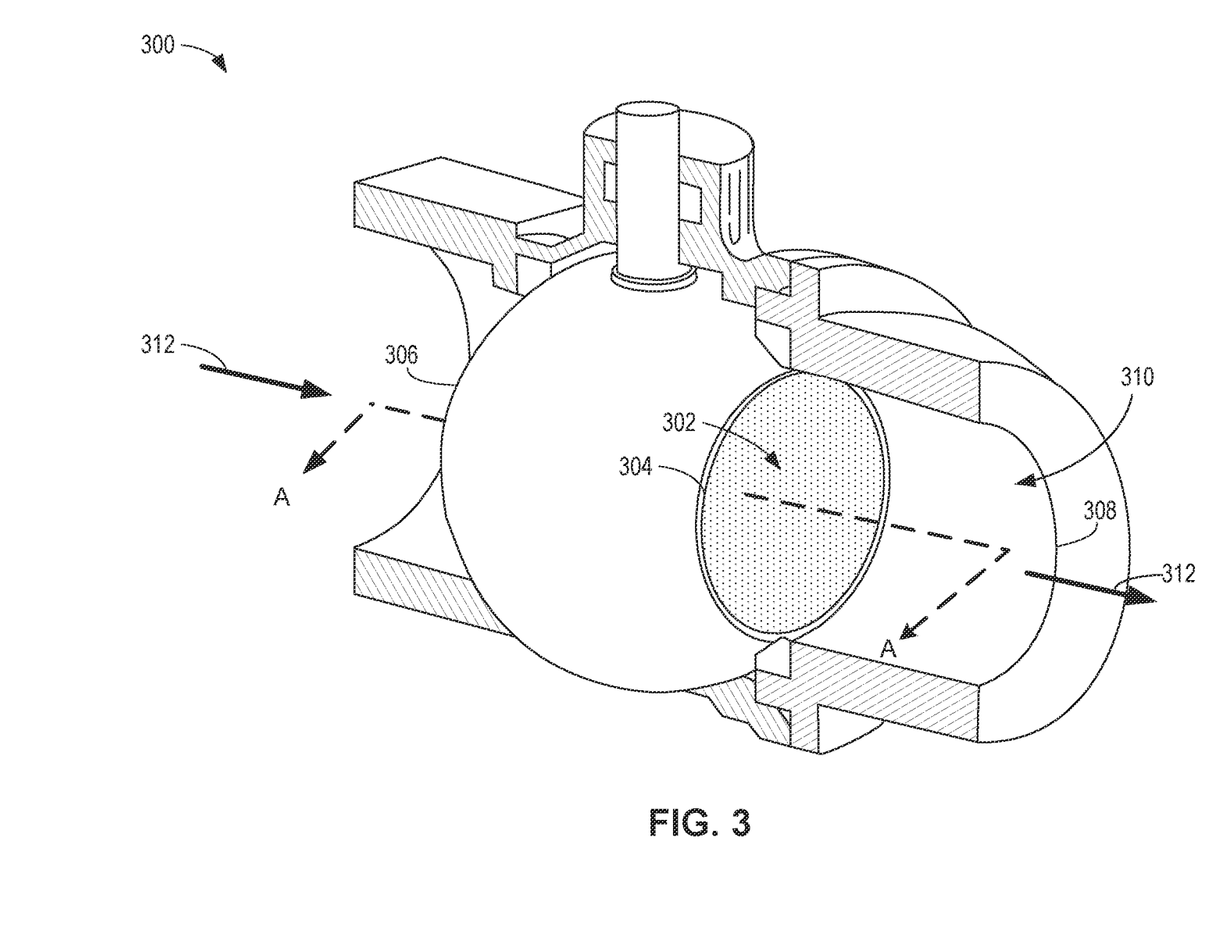
FIG. 3 is a partial cross-sectional view of another example valve in accordance with teachings of this disclosure.

FIG. 3 is a partial cross-sectional view of another example valve 300 in accordance with teachings of this disclosure. The example valve 300 of FIG. 3 is similar to the example valve 100 of FIG. 1 and the example valve 200 of FIG. 2. However, in the illustrated example of FIG. 3, a screen 302 is positioned within a central bore 304 of a ball 306. In particular, the screen 302 is generally concentric and/or aligned with the central bore 304. Additionally or alternatively, the example ball 306 includes annular cavities, as described in greater detail below in connection with FIGS. 4-5. In the example of FIG. 3, the valve 300 is depicted in an open position with the ball 306 positioned at a first rotational position and is generally concentric and/or aligned with an outlet 308 to permit fluid flow through an inner cavity 310, the central bore 304, and the screen 302 in a direction generally indicated by arrows 312. In a closed position of the valve 300, the ball 306 is rotatable to restrict (e.g., partially restrict) fluid flow through the valve 300. In particular, the valve 300 can be at least partially closed when the ball 306 is rotated to a second rotational position such that central bore 304 is at least partially offset with the outlet 308.

Figure 4:
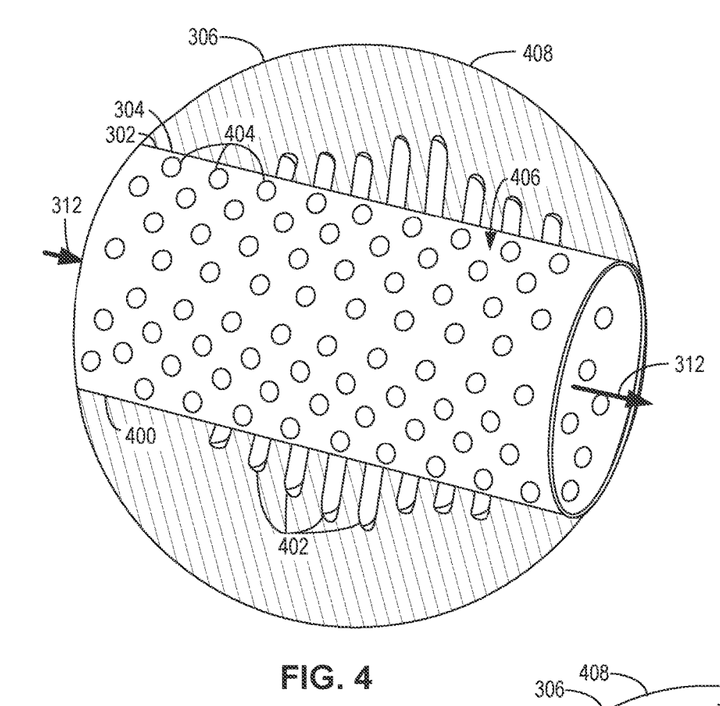
FIGS. 4 and 5 are partial cross-sectional views of an example ball of the example valve of FIG. 3.
Figure 5:
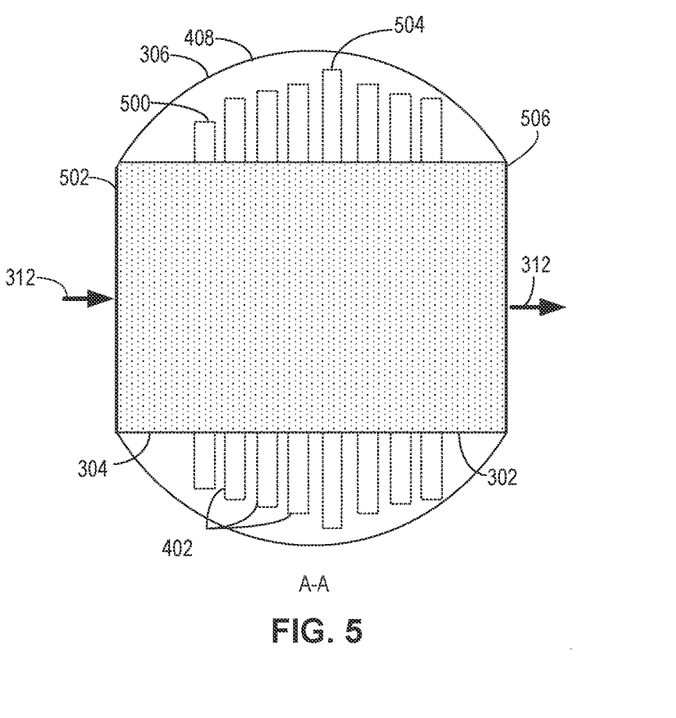

FIG. 4 is a perspective cutaway view of the example ball 306 shown in FIG. 3. The central bore 304 defines an inner surface 400 of the ball 306. The example inner surface 400 exhibits a generally cylindrical (e.g., curved) shape that can correspond to a shape of the bore 304 and/or the screen 302. In particular, the inner surface 400 includes annular cavities 402 spaced apart from each other along a longitudinal direction of the bore 304. In FIGS. 3-5, the screen 302 and the annular cavities 402 are generally concentric and/or aligned with one another. Additionally or alternatively, the screen 302 and the annular cavities 402 can be generally concentric and/or aligned with the central bore 304.

With the valve 300 in an open position or partially open position, fluid flows through the central bore 304 and the screen 302 in a direction generally indicated by the arrows 312. As a result, apertures 404 in the screen wall 406 enable sound waves associated with the moving fluid to travel back and forth between the annular cavities 402 of the inner surface 400 and the interior of the screen 302, thereby reducing acoustic output (e.g., in the form of noise) of the valve 300. To that end, the annular cavities 402 are arranged to reflect (e.g., vary a path of travel of) the sound waves. Thus, the screen 302 and the annular cavities 402 can reduce noise generated during operation of the valve 300 (FIG. 3).

In FIG. 1, the diameters of the cavities 114 follow the angle (e.g., curvature, shape, etc.) of the outer wall 109 (e.g., increasing in diameter when the wall 109 is tapered from the outlet 106 to the trim 116). In FIG. 2, the diameters of the cavities 206 follow the angle of the outer wall 201 (e.g., decreasing in diameter when the wall 201 is tapered from the trim 116 to the outlet 202). In the example shown in FIGS. 4 and 5, an outer wall 408 (e.g., a portion of the outer wall 408) exhibits a generally curved shape. As such, the diameters of the cavities 402 can follow the curvature of the wall 408.

FIG. 5 is a side view of the example ball 306 taken along the line A-A shown in FIG. 3. As illustrated in the example of FIG. 5, a first one of the cavities 500 at a first end 502 of the bore 304 can have a first diameter (e.g., a first depth into the surface 400 of FIG. 4) and a second one of the cavities 504 near and/or approaching a center of the bore 304 can have a second diameter (e.g., a second depth into the surface 400 of FIG. 4), that is greater than the first diameter (e.g., depth). In some examples, the size difference between ones of the cavities 402 can result from machining and/or manufacturing of the cavities 402. For example, at least one of the cavities 402 can be machined at a greater depth in the surface 400 (FIG. 4) than other ones of the cavities 402. In this example, the outer wall 408 can taper along a direction from the center of the bore 304 to the first end 502 and/or a second end 506 (generally indicated by the arrows 312). As such, the diameters of the annular cavities 402 can vary in size along the longitudinal direction of the bore 304. In particular, the annular cavities 402 can have an increasing diameter along a direction from the first end 502 to the center of the bore 304, and a decreasing diameter from the center of the bore 304 to the second end 506. The example screen 302 is aligned to and/or concentric with the annular cavities 402 and the bore 304.

Figure 6:
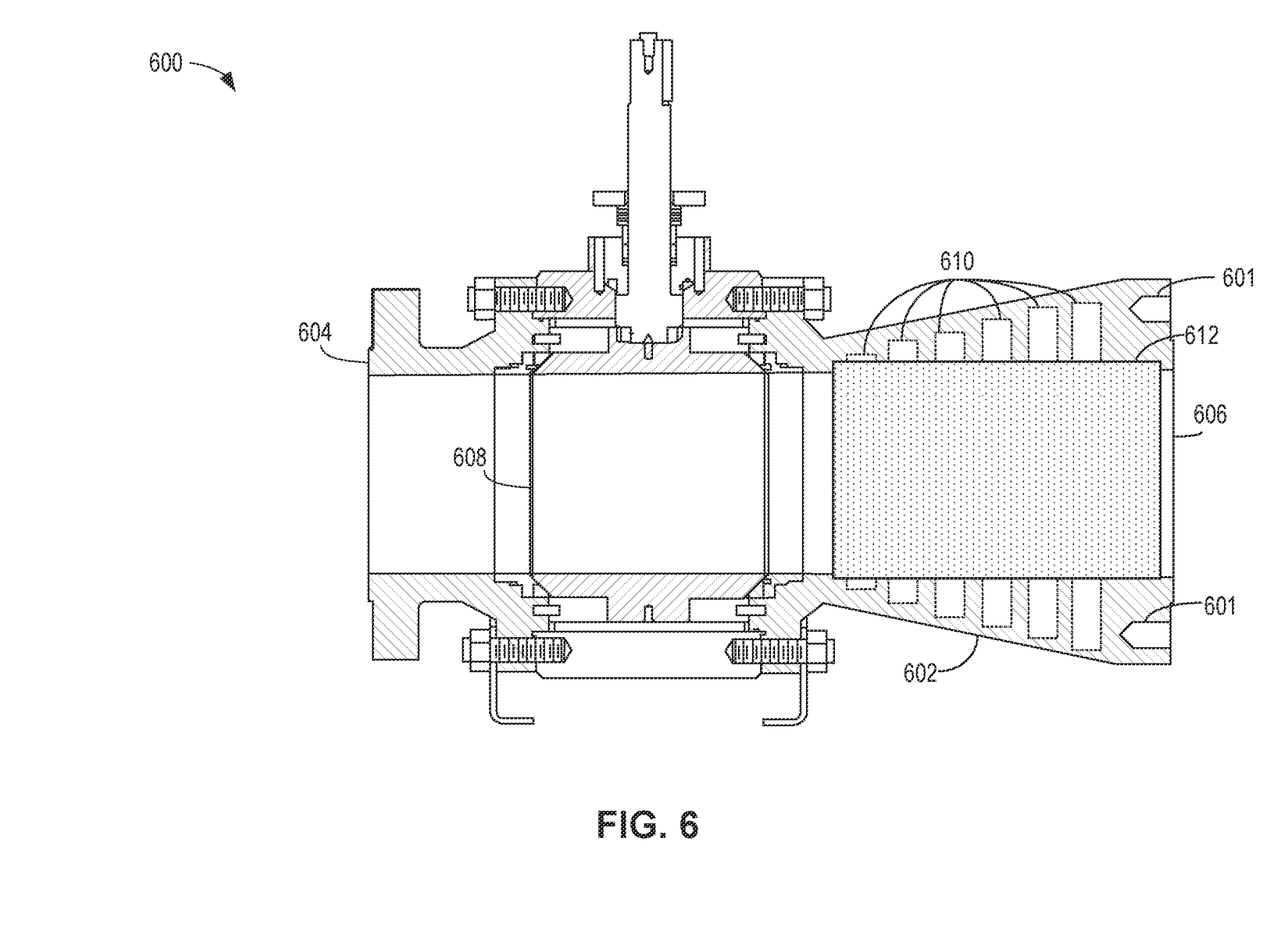
FIG. 6 is a cross-sectional view of another example valve in accordance with teachings of this disclosure.
Figure 8:
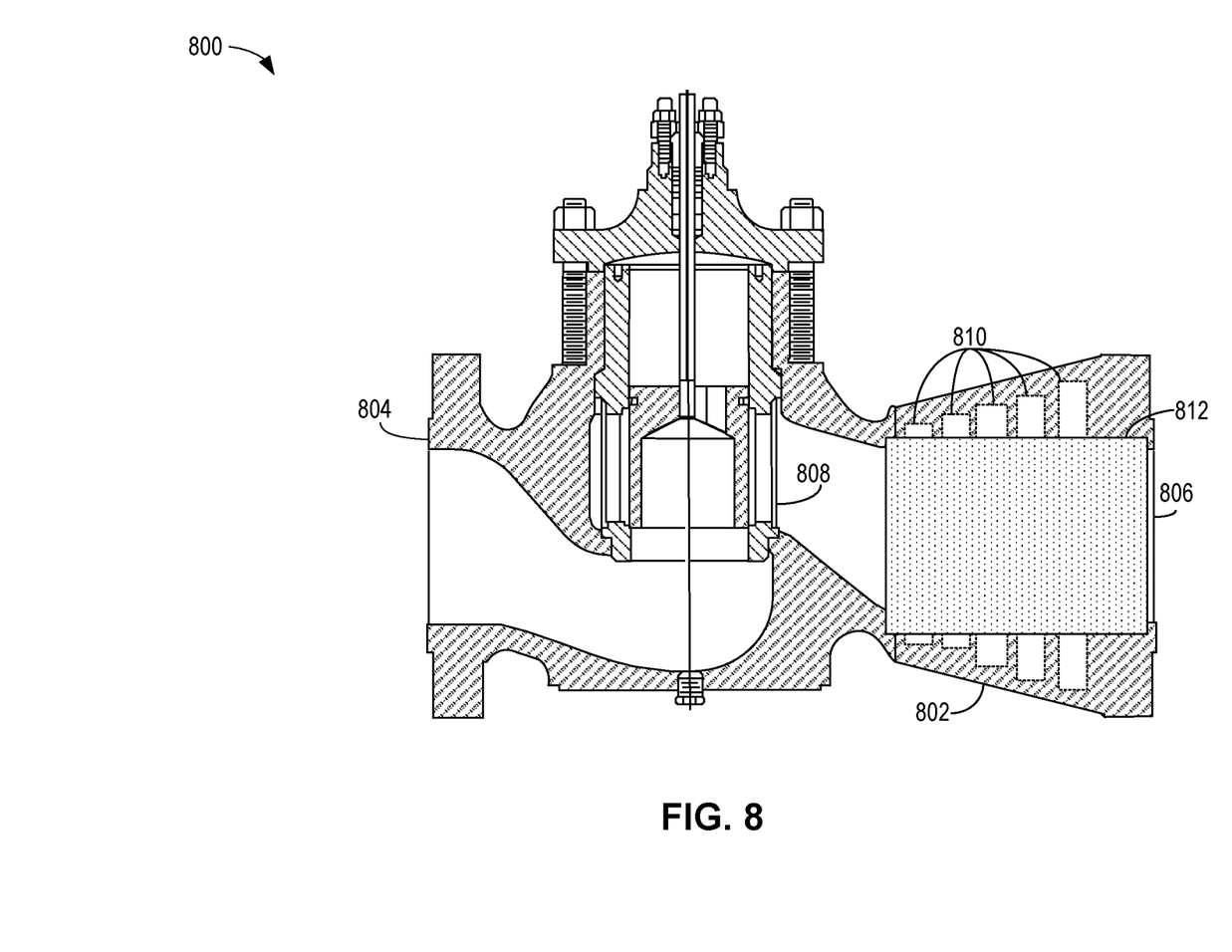
FIG. 8 is a cross-sectional view of yet another example valve in accordance with teachings of this disclosure.

FIG. 6 is a cross-sectional view of another example valve 600 in accordance with teachings of this disclosure. The example valve 600 of FIG. 6 is similar to the example valve 100 of FIG. 1. However, in FIG. 6, the example valve 600 includes holes 601 for different attachment options thereto (e.g., flange piping, nut and bolt attachment, etc.). In some examples, the holes 601 can be included in the example valve 100 (FIG. 1) and/or an example valve 800 (FIG. 8). The example valve 600 includes a wall 602 of a valve body 604 that tapers from an outlet 606 to a trim 608. Example annular cavities 610 increase in diameter from the trim 608 to the outlet 606. As a result, apertures in a screen wall of a screen 612 enable sound waves associated with the moving fluid to travel back and forth between the annular cavities 610 of the wall 602 and the interior of the screen 612, thereby reducing acoustic output the valve 600.

Figure 7:
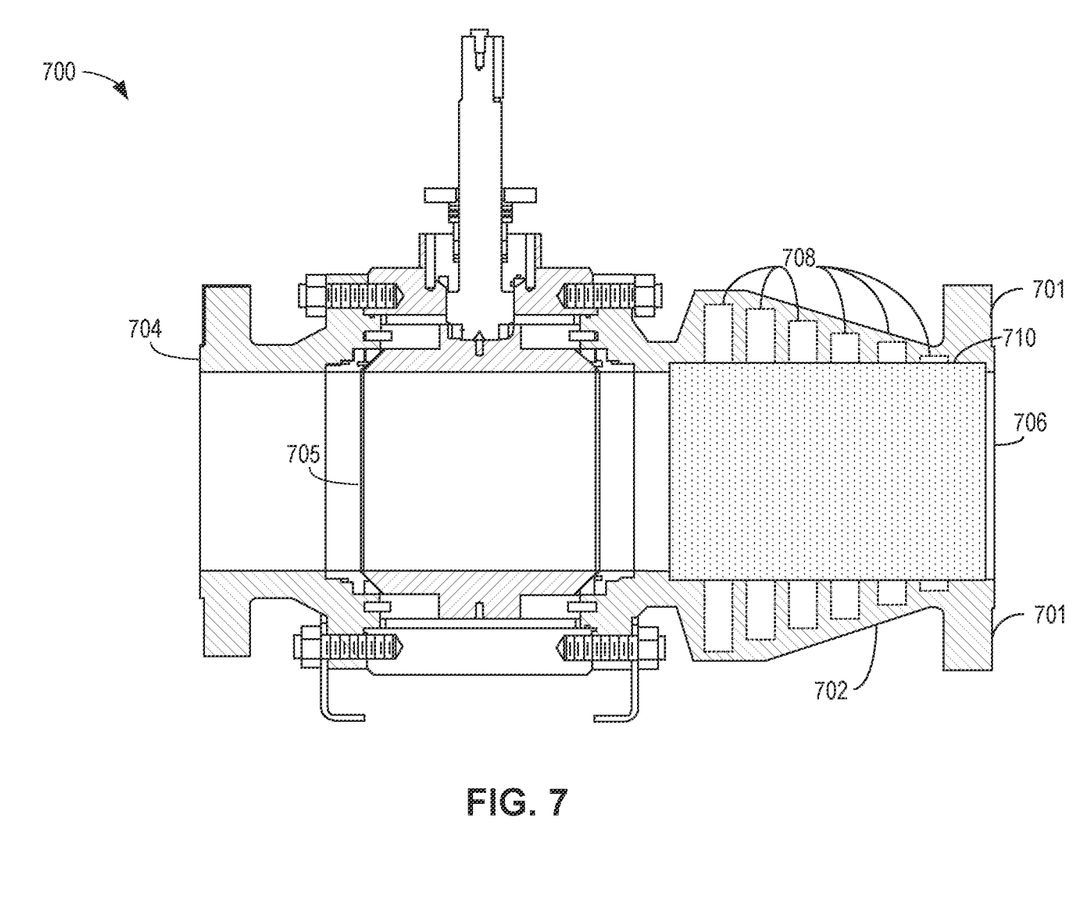
FIG. 7 is a cross-sectional view of another example valve in accordance with teachings of this disclosure.

FIG. 7 is a cross-sectional view of another example valve 700 in accordance with teachings of this disclosure. The example valve 700 of FIG. 7 is similar to the example valve 600 of FIG. 6 but, instead, the valve 700 includes flanges 701 for different attachment options thereto (e.g., flange piping, nut and bolt attachment, etc.). In some examples, the flanges 701 can be included in the example valve 200 (FIG. 2). The example valve 700 includes a wall 702 of a valve body 704 that tapers from the trim 705 to an outlet 706. Example annular cavities 708 increase in diameter from the outlet 706 to the trim 705. As a result, apertures in a screen wall of a screen 710 enable sound waves associated with the moving fluid to travel back and forth between the annular cavities 708 and the interior of the screen 710 thereby reducing acoustic output (e.g., in the form of noise) of the valve 700.

FIG. 8 is a cross-sectional view of yet another example valve 800 in accordance with teachings of this disclosure. The example valve 800 of FIG. 8 is similar to the example valve 100 of FIG. 1 but, instead, the example valve 800 is a sliding stem valve. The example sliding stem valve 800 includes a wall 802 of a valve body 804 that tapers from an outlet 806 to a trim 808. Example annular cavities 810 increase in diameter from the trim 808 to the outlet 806. As a result, apertures in a screen wall of a screen 812 enable sound waves associated with the moving fluid to travel back and forth between the annular cavities 810 of the wall 802 and the interior of the screen 812, thereby reducing acoustic output (e.g., in the form of noise) of the valve 800.

Figure 9:
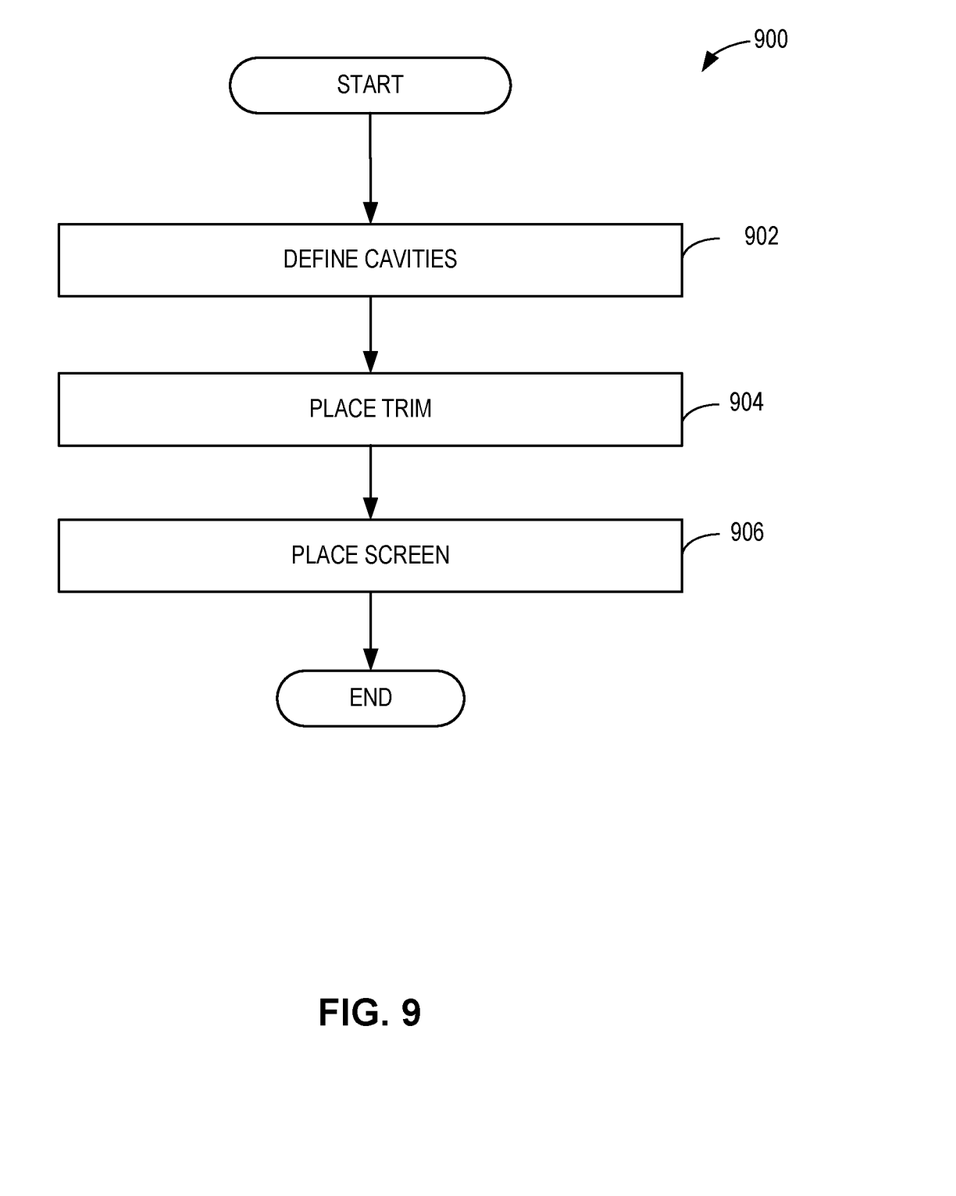
FIG. 9 is a flowchart representative of an example method to produce examples disclosed herein.

FIG. 9 is a flowchart representative of an example method 900 to manufacture example disclosed herein. In this example, the valve 100 is being manufactured to include the annular cavities 114 and the screen 122. In other examples, any of the valves 100, 200, 300, 600, 700, 800 are manufactured to include the annular cavities 114, 206, 402, 602, 610, 708, 810 and the screens 122, 214, 302, 612, 710, 812.

At block 902, the example annular cavities 114 are defined in the valve 100. For example, the inner wall 108 is manufactured (e.g., machined, cast, 3D manufactured etc.) to include the annular cavities 114. In some examples, the annular cavities 114 are defined in the inner cavity 110 of the valve body 102. In some examples, annular cavities 402 are defined within the central bore 304 of the rotary ball 306. In the example of FIG. 1, the cavities 114 are defined in the inner wall 108 to resemble the shape of the screen 122. As such, the cavities 114 are manufactured to fit (e.g., receive) the screen 122 (e.g., the cylindrical shape of the screen).

At block 904, the example trim 116 is placed (e.g., positioned) in the valve body 102.

At block 906, the example screen 122 is placed, assembled and/or positioned in the inner cavity 110. In some examples, the screen 302 is added to the central bore 304. In some examples, the screen 122 is fully surrounded by the cavities 114. In some examples, the screen 302 is placed within the central bore 304 of the ball 306. Then, the process ends.

From the foregoing, it will be appreciated that example systems, methods, apparatus, and articles of manufacture have been disclosed that can reduce relatively high noise levels produced by the aforementioned flow of fluid. Examples disclosed herein include a perforated screen disposed within a wall of a valve for diverting (e.g., disrupting, dispersing, etc.) sound waves in a body of the valve. To that end, examples disclosed herein include annular cavities positioned on inner walls of the valve, such that the cavities disrupt sound waves. In some examples, the perforated screen and the annular cavities can be included in a rotary ball of a ball valve. In some such examples, annular cavities are positioned on an inner surface of a ball, wherein the cavities disrupt the aforementioned frequencies of sound waves. In some examples, the perforated screen and the annular cavities can be associated with the rotary ball of the ball valve.

Example 1 includes a valve comprising a valve body defining an inner cavity that fluidly couples an inlet of the valve and an outlet of the valve, the inner cavity having an inner wall with annular cavities spaced apart from one another along a direction of flow of the valve body, a trim to vary a degree of flow of fluid between the inlet and the outlet, and a screen positioned within the inner cavity, the screen at least partially surrounded by the annular cavities and including a pattern of apertures to disperse sound waves generated when the fluid moves therethrough.

Example 2 includes the valve of example 1, wherein the screen is a generally cylindrical shape.

Example 3 includes the valve of example 2, wherein a center axis of the cylindrical shape and a center axis of the inner wall are generally aligned.

Example 4 includes the valve of example 1, wherein the screen includes a first diameter and the inner wall includes a second diameter, the first diameter substantially the same as the second diameter.

Example 5 includes the valve of example 1, wherein the annular cavities and the screen are positioned between the trim and the outlet.

Example 6 includes the valve of example 1, wherein the valve body includes an outer wall, at least a portion of the outer wall to taper along a direction from the trim to the outlet.

Example 7 includes the valve of example 1, wherein the valve body includes an outer wall, at least a portion of the outer wall to taper along a direction from the outlet to the trim.

Example 8 includes the valve of example 1, wherein the annular cavities increase in diameter along a direction from the trim to the outlet.

Example 9 includes the valve of example 1, wherein the trim includes a rotary ball, and wherein the screen is positioned within a central bore of the rotary ball, the central bore including an inner surface with the annular cavities spaced apart from each other along the direction of flow.

Example 10 includes the valve of example 9, wherein the annular cavities vary in depth along a longitudinal direction of flow associated with the rotary ball.

Example 11 includes an apparatus for use with a valve, the apparatus comprising a wall defining a fluid passageway between an inlet and an outlet, wherein at least a portion of the wall includes ring-shaped grooves positioned downstream from a trim of the valve, the ring-shaped grooves spaced apart from one another along a direction of flow of the fluid passageway, and a screen extending along the direction of flow of the wall, the screen including a pattern of apertures at least partially surrounded by the ring-shaped grooves to disperse sound waves generated when a fluid moves through the valve.

Example 12 includes the apparatus of example 11, wherein the apertures define a perforated pattern.

Example 13 includes the apparatus of example 11, wherein ones of the ring-shaped grooves are positioned at different positions along the direction of flow of the wall.

Example 14 includes the apparatus of example 11, wherein the valve includes an outer wall, at least a portion of the outer wall tapers along a direction from the trim to the outlet, and wherein the ring-shaped grooves increase in diameter along a direction from the outlet to the trim.

Example 15 includes the apparatus of example 11, wherein the valve includes an outer wall, at least a portion of the outer wall tapers along a direction from the outlet to the trim, and wherein the ring-shaped grooves increase in diameter along a direction from the trim to the outlet.

Example 16 includes the apparatus of example 11, wherein the trim includes a rotary ball, and wherein the screen is positioned within a bore of the rotary ball, the bore including the wall with the ring-shaped grooves positioned thereon.

Example 17 includes the apparatus of example 16, wherein the ring-shaped grooves vary in depth along a longitudinal direction of flow associated with the rotary ball.

Example 18 includes the valve of example 16, wherein the screen includes a first diameter and the bore includes a second diameter, the first diameter substantially the same as the second diameter.

Example 19 includes a method of producing a noise reduction valve, the method comprising positioning a trim in a valve body, an inner cavity of the valve body having annular cavities, the inner cavity fluidly coupled to an inlet and an outlet of the valve, the inner cavity having the annular cavities spaced apart from one another along a direction of flow of the valve body, and placing a screen in the inner cavity to at least partially surround the screen with the annular cavities, the screen including a pattern of apertures.

Example 20 includes the method of example 19, further including defining the annular cavities in a central bore of a rotary ball, the central bore including an inner surface with the annular cavities spaced apart from each other along the direction of flow, and wherein placing the screen includes placing the screen in the central bore.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A valve comprising:
  a valve body defining an inner cavity that fluidly couples an inlet of the valve and an outlet of the valve, the inner cavity having an inner wall with first, second, and third annular cavities spaced apart from one another along a direction of flow of the valve body, the first annular cavity positioned at a first longitudinal position, the second annular cavity positioned at a second longitudinal position, the third annular cavity positioned at a third longitudinal position at the outlet, the first annular cavity having a first radial width, the second annular cavity having a second radial width greater than the first radial width, the third annular cavity having a third radial width greater than the second radial width;
  a trim to vary a degree of flow of fluid between the inlet and the outlet, the first longitudinal position associated with the first annular cavity positioned at the trim; and
  a screen positioned within the inner cavity, the screen at least partially surrounded by the first, second, and third annular cavities and including a pattern of apertures to disperse sound waves generated when the fluid moves therethrough.

2. The valve of claim 1, wherein the screen is a generally cylindrical shape.

3. The valve of claim 2, wherein a center axis of the cylindrical shape and a center axis of the inner wall are generally aligned.

4. The valve of claim 1, wherein the screen includes a first diameter and the inner wall includes a second diameter, the first diameter substantially the same as the second diameter.

5. The valve of claim 1, wherein the first, second, and third annular cavities and the screen are positioned between the trim and the outlet.

6. The valve of claim 1, wherein the valve body includes an outer wall, at least a portion of the outer wall to taper along a direction from the outlet to the trim.

7. The valve of claim 1, wherein the trim includes a rotary ball.

8. The valve of claim 1, wherein the first, second, and third annular cavities vary in depth along the direction of flow.

9. The valve of claim 1, wherein the valve body includes an outer wall, at least a portion of the outer wall to taper along a direction from the trim to the outlet.

10. An apparatus for use with a valve, the apparatus comprising:
  a wall defining a fluid passageway between an inlet and an outlet, wherein at least a portion of the wall includes first, second, and third ring-shaped grooves positioned downstream from a trim of the valve, the first, second, and third ring-shaped grooves spaced apart from one another along a direction of flow of the fluid passageway, the first ring-shaped groove positioned at a first longitudinal position at the trim, the second ring-shaped groove positioned at a second longitudinal position, the third ring-shaped groove positioned at a third longitudinal position at the outlet the first ring-shaped groove having a first radial width, the second ring-shaped groove having a second radial width greater than the first radial width, the third ring-shaped groove having a third radial width greater than the second radial width; and
  a screen extending along the direction of flow of the wall, the screen including a pattern of apertures at least partially surrounded by the first, second, and third ring-shaped grooves to disperse sound waves generated when a fluid moves through the valve.

11. The apparatus of claim 10, wherein the apertures define a perforated pattern.

12. The apparatus of claim 10, wherein the first, second, and third ring-shaped grooves are positioned along the direction of flow of the wall.

13. The apparatus of claim 10, wherein the valve includes an outer wall, and wherein at least a portion of the outer wall tapers along a direction from the outlet to the trim.

14. The apparatus of claim 10, wherein the trim includes a rotary ball, the rotary ball having a bore.

15. The apparatus of claim 10, wherein the first, second, and third ring-shaped grooves vary in depth along the direction of flow.

16. The valve of claim 14, wherein the screen includes a first diameter and the bore includes a second diameter, the first diameter substantially the same as the second diameter.

17. A method of producing a noise reduction valve, the method comprising:
  positioning a trim in a valve body, an inner cavity of the valve body having first, second, and third annular cavities, the inner cavity fluidly coupled to an inlet and an outlet of the valve, the inner cavity having the first, second, and third annular cavities spaced apart from one another along a direction of flow of the valve body, the first annular cavity positioned at a first longitudinal position at the trim, the second annular cavity positioned at a second longitudinal position, the third annular cavity positioned at a third longitudinal position at the outlet the first annular cavity having a first radial width, the second annular cavity having a second radial width greater than the first radial width, the third annular cavity having a third radial width greater than the second radial width; and
  placing a screen in the inner cavity to at least partially surround the screen with the first, second, and third annular cavities, the screen including a pattern of apertures.

18. The apparatus of claim 10, wherein the valve includes an outer wall, and wherein at least a portion of the outer wall tapers along a direction from the trim to the outlet.

19. The method of claim 17, wherein the trim includes a rotary ball, further including:
defining the first, second and third annular cavities in the inner cavity of the valve body, the first longitudinal position associated with the first annular cavity positioned at the rotary ball.

* * * * *